United States Patent
Park et al.

(10) Patent No.: US 12,272,806 B2
(45) Date of Patent: Apr. 8, 2025

(54) BATTERY PACK AND DEVICE INCLUDING THE SAME

(71) Applicant: LG Energy Solution, Ltd., Seoul (KR)

(72) Inventors: Subin Park, Daejeon (KR); Junyeob Seong, Daejeon (KR); Won Kyoung Park, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 594 days.

(21) Appl. No.: 17/616,467

(22) PCT Filed: Mar. 15, 2021

(86) PCT No.: PCT/KR2021/003178
§ 371 (c)(1),
(2) Date: Dec. 3, 2021

(87) PCT Pub. No.: WO2021/261709
PCT Pub. Date: Dec. 30, 2021

(65) Prior Publication Data
US 2023/0110762 A1 Apr. 13, 2023

(30) Foreign Application Priority Data

Jun. 22, 2020 (KR) ........................ 10-2020-0075955

(51) Int. Cl.
*H01M 10/653* (2014.01)
*H01M 10/647* (2014.01)
(Continued)

(52) U.S. Cl.
CPC ....... *H01M 10/653* (2015.04); *H01M 10/647* (2015.04); *H01M 50/204* (2021.01); *H01M 50/24* (2021.01); *H01M 50/533* (2021.01)

(58) Field of Classification Search
None
See application file for complete search history.

(56) References Cited

U.S. PATENT DOCUMENTS

| | | | |
|---|---|---|---|
| 2006/0216600 A1* | 9/2006 | Inagaki | H01M 50/178 429/223 |
| 2007/0059587 A1* | 3/2007 | Kishi | H01M 10/482 429/50 |
| 2014/0038012 A1 | 2/2014 | Alimario et al. | |
| 2014/0212722 A1 | 7/2014 | Lee et al. | |

(Continued)

FOREIGN PATENT DOCUMENTS

| | | |
|---|---|---|
| CN | 206806391 U | 12/2017 |
| CN | 208157589 U | 11/2018 |

(Continued)

OTHER PUBLICATIONS

Machine Translation of WO-2020009484-A1 (Year: 2020).*

(Continued)

*Primary Examiner* — Gregg Cantelmo
(74) *Attorney, Agent, or Firm* — Lerner David LLP (57) ABSTRACT

A battery pack includes: a lower pack housing having a plurality of module regions; a plurality of thermally conductive resin layers disposed in respective ones of the plurality of module regions; and a plurality of cell blocks mounted on respective ones of the plurality of module regions at an upper side of the respective thermally conductive resin layer, wherein each of the plurality of cell blocks includes: a battery cell stack in which a plurality of battery cells are stacked; and an insulator that surrounds the battery cell stack.

6 Claims, 6 Drawing Sheets

(51) Int. Cl.
    *H01M 50/204*     (2021.01)
    *H01M 50/24*     (2021.01)
    *H01M 50/533*     (2021.01)

(56) References Cited

U.S. PATENT DOCUMENTS

| | | | |
|---|---|---|---|
| 2014/0212723 | A1 | 7/2014 | Lee et al. |
| 2014/0212724 | A1 | 7/2014 | Lee et al. |
| 2017/0263903 | A1 | 9/2017 | Petrevski et al. |
| 2018/0034117 | A1 | 2/2018 | Bang et al. |
| 2018/0375180 | A1 | 12/2018 | Buck et al. |
| 2019/0006644 | A1 | 1/2019 | Sakurai |
| 2019/0348726 | A1 | 11/2019 | Marpu et al. |
| 2020/0006726 | A1 | 1/2020 | Shin et al. |
| 2020/0161606 | A1 * | 5/2020 | Yu .................. H01M 50/233 |
| 2020/0161729 | A1 | 5/2020 | Kim et al. |
| 2020/0176745 | A1 | 6/2020 | Lee |
| 2020/0343499 | A1 | 10/2020 | Yoo et al. |
| 2020/0388805 | A1 | 12/2020 | Yoo et al. |
| 2021/0135320 | A1 | 5/2021 | Murata et al. |

FOREIGN PATENT DOCUMENTS

| | | |
|---|---|---|
| CN | 109920944 A | 6/2019 |
| JP | 2002-100411 A | 4/2002 |
| JP | 2005310449 A | 11/2005 |
| JP | 2011-503800 A | 1/2011 |
| KR | 20130069468 A | 6/2013 |
| KR | 20160101382 A | 8/2016 |
| KR | 101661972 B1 | 10/2016 |
| KR | 20180133728 A | 12/2018 |
| KR | 20190054709 A | 5/2019 |
| KR | 2019-0138358 A | 12/2019 |
| KR | 20200002349 A | 1/2020 |
| KR | 20200004186 A | 1/2020 |
| KR | 2020-0015207 A | 2/2020 |
| KR | 20200030964 A | 3/2020 |
| KR | 20200030967 A | 3/2020 |
| WO | WO-2020009484 A1 * | 1/2020 .......... H01M 10/613 |
| WO | 2020084707 A1 | 4/2020 |

OTHER PUBLICATIONS

Machine Translation of KR 20160101382A (Year: 2016).*
International Search Report for PCT/KR2021/003178 dated Jul. 5, 2020, 3 pgs.
Search Report dated Apr. 24, 2024 from Office Action for Chinese Application No. 202180003515.5 issued Apr. 29, 2024. 3 pgs. (see p. 2, categorizing the cited references).

* cited by examiner

PRIOR ART

FIG. 6 PRIOR ART

BATTERY PACK AND DEVICE INCLUDING THE SAME

CROSS-REFERENCE TO RELATED APPLICATIONS

This application is a national phase entry under 35 U.S.C. § 371 of International Application No. PCT/KR2021/003178, filed on Mar. 15, 2021, published in Korean, which claims the benefit of Korean Patent Application No. 10-2020-0075955 filed on Jun. 22, 2020 in the Korean Intellectual Property Office, the disclosures of which are incorporated herein by reference in their entireties.

TECHNICAL FIELD

The present disclosure relates to a battery pack and a device including the same, and more particularly to a battery pack that can secure insulation performance and a device including the same.

BACKGROUND ART

A secondary battery has attracted much attention as an energy source in various products such as a mobile device and an electric vehicle. The secondary battery is a potent energy resource that can replace the use of existing products using fossil fuels, and is in the spotlight as an environment-friendly energy source because it does not generate by-products due to energy use.

Recently, along with a continuous rise of the necessity for a large-capacity secondary battery structure, including the utilization of the secondary battery as an energy storage source, there is a growing demand for a battery pack of a multi-module structure which is an assembly of battery modules in which a plurality of secondary batteries are connected in series/parallel.

Meanwhile, when a plurality of battery cells are connected in series or in parallel to configure a battery pack, it is common to configure a battery module composed of at least one battery cell first, and then configure a battery pack by using at least one of the battery modules and adding other components.

However, when configuring a battery pack using a battery module, a two-step assembly process, in which a battery cell is manufactured in units of battery modules, and then the battery modules manufactured in units of battery modules are housed in the battery pack again, is required, which causes a problem in that an overall manufacturing process is complicated.

Further, the insulation performance in the battery pack structure is a performance which is essential for the stability of the battery pack, and during the manufacturing process of the battery module, an additional process of inserting the insulating structure module into the inside of the battery module is required. At this time, in the process in which the insulation structure is installed inside the battery module and then the battery module installed with the insulation structure is installed to the battery pack again, the assembling process of the battery module becomes considerably complicated, and the insulation structure is formed between the complex internal structures, whereby interference occurs and thus, it may be difficult to secure basic insulation performance.

DETAILED DESCRIPTION OF THE INVENTION

Technical Problem

It is an object of the present disclosure to provide a battery pack that simplifies the manufacturing process of the battery pack, and a device including the same.

It is another object of the present disclosure to provide a battery pack having improved insulation performance and a device including the same.

The objects of the present disclosure are not limited to the aforementioned objects, and other objects which are not described herein should be clearly understood by those skilled in the art from the following detailed description and the accompanying drawings.

Technical Solution

According to one embodiment of the present disclosure, there is provided a battery pack comprising: a lower pack housing having a plurality of module regions; a plurality of thermally conductive resin layers disposed in respective ones of the plurality of module regions; and a plurality of cell blocks mounted on respective ones of the plurality of module regions at an upper side of the respective thermally conductive resin layer, wherein each of the plurality of cell blocks includes: a battery cell stack in which a plurality of battery cells are stacked; and an insulator that surrounds the battery cell stack.

The battery pack may further include an upper pack housing that covers an upper portion of the plurality of cell blocks.

In each of the plurality of cell blocks, the insulator may cover upper, lower, left and right surfaces of the battery cell stack except for a portion in which an electrode lead is disposed in the battery cell stack.

In each of the plurality of cell blocks, side surface plates may be located between respective side surfaces of the battery cell stack and the insulator.

The side surface plates may be elastic.

The side surface plates may be comprised of a rubber.

The side surface plates may be formed by injection.

In at least one of the plurality of cell blocks, the insulator may be a heat shrinkage tube.

In at least one of the plurality of cell blocks, the insulator may be an insulating tape.

According to one embodiment of the present disclosure, there is provided a device comprising the above battery pack.

Advantageous Effects

The battery pack and the device including the same according to one embodiment of the present disclosure can simplify the assembling process and structure of the battery pack, can reduce the weight of the battery pack, can secure insulation performance in a simplified cell block unit and can improve insulation performance of the battery pack.

The effects of the present disclosure are not limited to the effects mentioned above and additional other effects not described above will be clearly understood from the description of the appended claims by those skilled in the art.

DETAILED DESCRIPTION OF THE EMBODIMENTS

It should be appreciated that the exemplary embodiments, which will be described below, are illustratively described to help understand the present disclosure, and the present disclosure may be variously modified to be carried out differently from the exemplary embodiments described herein. However, in the description of the present disclosure, the specific descriptions and illustrations of publicly known functions or constituent elements will be omitted when it is determined that the specific descriptions and illustrations may unnecessarily obscure the subject matter of the present disclosure. In addition, in order to help understand the present disclosure, the accompanying drawings are not illustrated based on actual scales, but parts of the constituent elements may be exaggerated in size.

As used herein, terms such as first, second, and the like may be used to describe various components, and the components are not limited by the terms. The terms are used only to discriminate one component from another component.

Further, the terms used herein are used only to describe specific exemplary embodiments, and are not intended to limit the scope of the present disclosure. A singular expression includes a plural expression unless they have definitely opposite meanings in the context. It should be understood that the terms "comprise", "include", and "have" as used herein are intended to designate the presence of stated features, numbers, steps, constitutional elements, or combinations thereof, but it should be understood that they do not preclude a possibility of existence or addition of one or more other features, numbers, steps, constitutional elements, or combinations thereof.

Hereinafter, the overall configuration of the battery pack according to one embodiment of the present disclosure will be described with reference to FIG. 1.

Figure 1:
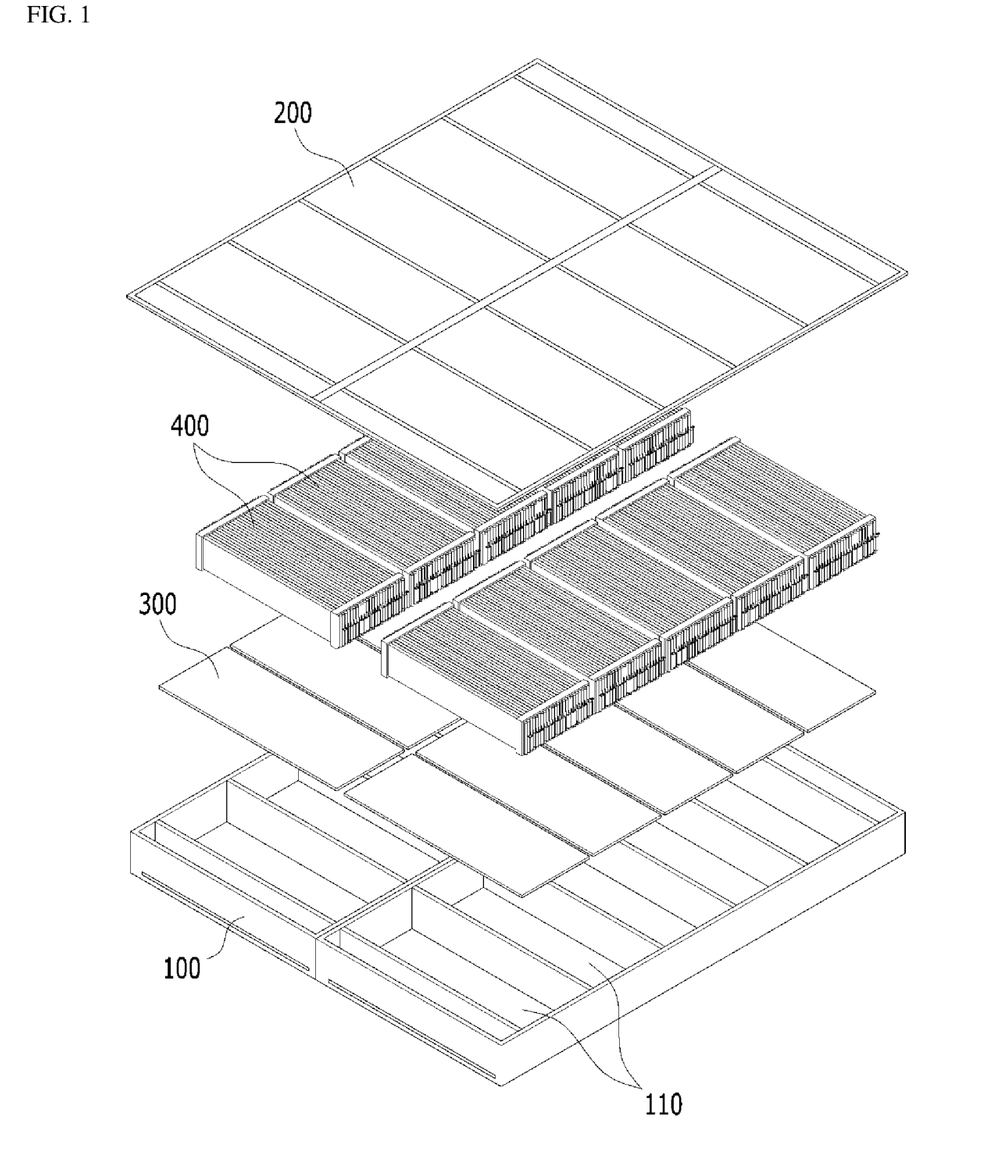
FIG. 1 is a view showing a battery pack according to an embodiment of the present disclosure.

FIG. 1 is a view showing a battery pack according to an embodiment of the present disclosure.

Figure 3:
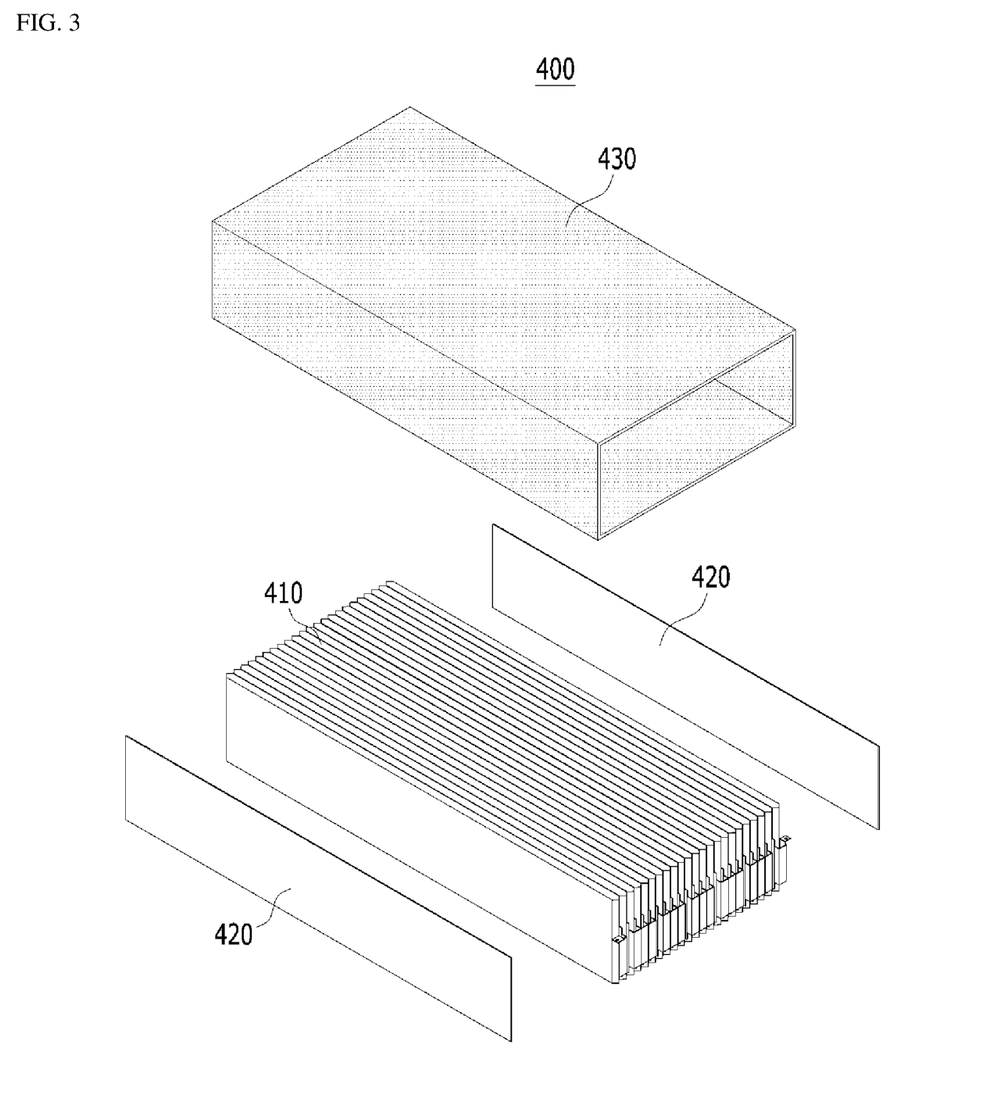
FIG. 3 is an exploded perspective view showing the cell block of FIG. 2.

Referring to FIG. 1, the battery pack according to one embodiment of the present disclosure includes a lower pack housing 100 having a plurality of module regions, a thermally conductive resin layer 300 coated in the module region, and a cell block 400 mounted on each of the plurality of module regions at the upper side of the thermally conductive resin layer 300. Referring to FIG. 3, the cell block 400 includes a battery cell stack 410 in which a plurality of battery cells are stacked and an insulator 430 that surrounds the battery cell stack.

The lower pack housing 100 houses a plurality of cell blocks 400. The plurality of module regions of the lower pack housing 100 can be formed to a size corresponding to the size of the cell block 400, and the plurality of cell blocks 400 may be respectively seated in a plurality of module regions. According to the present embodiment, the plurality of cell blocks 400 may be arranged in two rows along the stacking direction of the battery cells.

A partition wall 110 is formed between module regions to partition the module regions. The partition wall 110 may be formed so as to face side surfaces of the cell block 400 seated in the module regions. The lower pack housing 100 and the partition wall 110 formed therein may protect the plurality of cell blocks 400 from external impacts.

The thermally conductive resin layer 300 may be formed on the bottom surface of the lower pack housing 100. The thermally conductive resin layer 300 may transfer heat generated from the plurality of cell blocks 400 arranged in each of the plurality of module regions to the outside of the battery pack. The thermally conductive resin layer 300 may be formed by curing the coated thermally conductive resin. The cell block 400 may be seated in each of the plurality of module regions before the thermally conductive resin is cured. Heat transferred to the thermally conductive resin layer 300 may be discharged to the outside through the lower side of the lower pack housing 100.

According to the present embodiment, an upper pack housing 200 for covering an upper portion of the cell block 400 may be further included. The upper pack housing 200 may be coupled to the lower pack housing 100 and the partition wall 110 formed in the lower pack housing 100. The plurality of cell blocks 400 may be fixed in up and down directions through the upper pack housing 200, and the plurality of cell blocks can be protected from external force.

Figure 2:
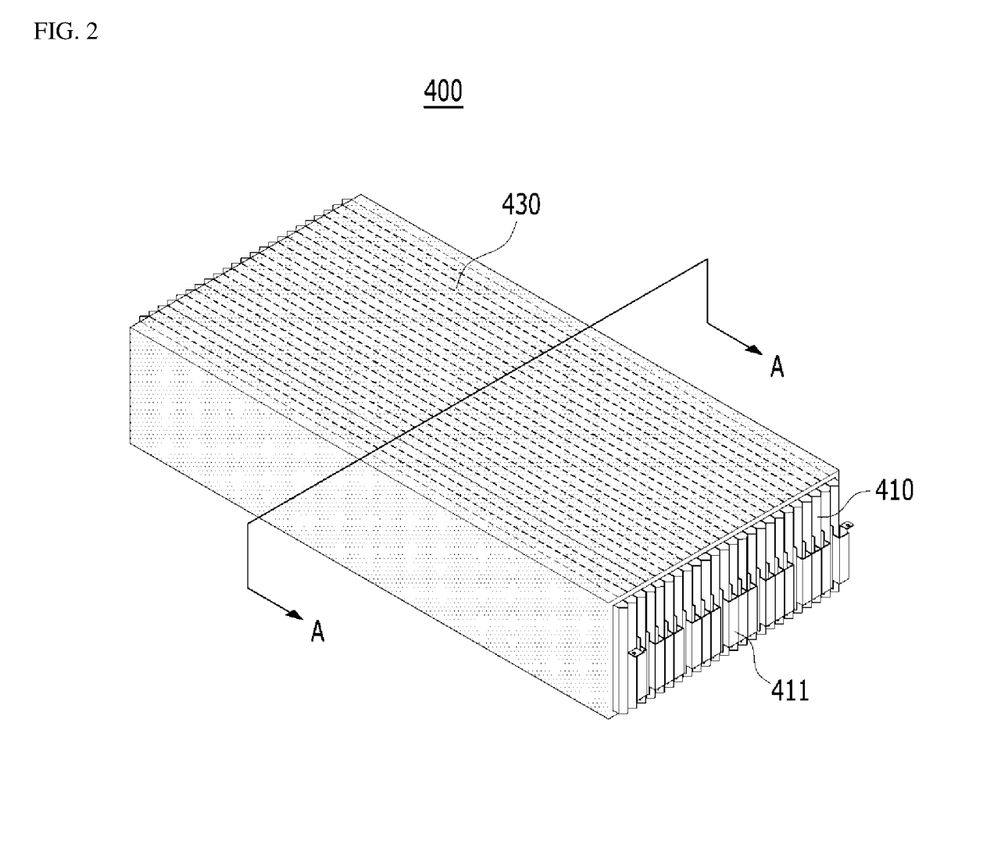
FIG. 2 is a view showing a cell block of FIG. 1.

Conventionally, a structure in which a battery cell stack and various components connected thereto are assembled to form a battery module, and a plurality of battery modules are housed in a battery pack again has been adopted. However, as shown in FIGS. 1 and 2, the battery pack according to the embodiment of the present disclosure is formed in a module-less structure in which a cell block 400 formed only of a battery cell stack 410 and an insulator 430 that surrounds the battery cell stack is directly coupled to a lower pack housing 100 forming a battery pack, so that it is possible to form a battery pack structure having a simple structure in which the cell block including the battery cell stack is directly coupled to the battery pack housing structure, without the necessity of manufacturing a separate battery module as in the prior art. Thereby, the overall manufacturing process of the battery pack can be simplified, the manufacturing costs of the battery pack can be reduced, and the weight of the battery pack can be reduced.

Hereinafter, the battery cell stack in which an insulator is formed according to an embodiment of the present disclosure will be described with reference to FIGS. 2 to 4 together with a comparative example.

FIG. 2 is a view showing a cell block of FIG. 1. FIG. 3 is an exploded perspective view showing the cell block of FIG. 2. FIG. 4 is a cross-sectional view showing a portion A-A of FIG. 2.

Figure 4:
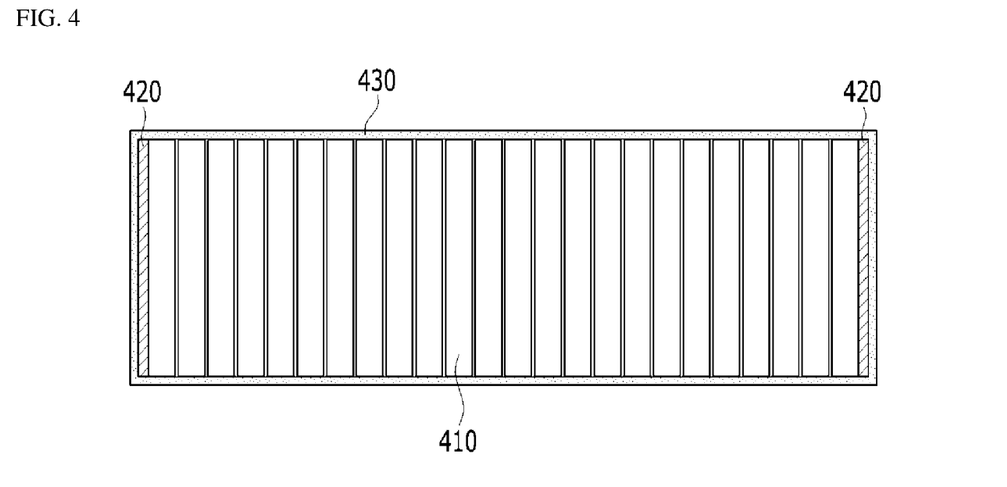
FIG. 4 is a cross-sectional view showing a portion A-A of FIG. 2.

Referring to FIGS. 2 to 4, the cell block 400 according to one embodiment of the present disclosure includes a battery cell stack 410 in which a plurality of battery cells are stacked, and an insulator 430 that surrounds the battery cell stack 410.

The battery cell is a secondary battery and may be configured as a pouch-type secondary battery. Such a battery cell 100 may be composed of a plurality of cells, and the plurality of battery cells may be stacked together so as to be electrically connected to each other, thereby forming the battery cell stack 410. Each of the plurality of battery cells may include an electrode assembly, a battery case, and an electrode lead formed protrusively at both ends from the electrode assembly.

The insulator 430 is formed so as to surround the battery cell stack. In more detail, referring to FIG. 2, the insulator 430 may cover the upper, lower, left, and right surfaces of the battery cell stack 410 except for a portion in which the electrode lead 411 is formed in the battery cell stack 410. The insulator 430 can cover the battery cell stack 410, thereby securing the insulating performance of the battery cell stack 410.

Figure 5:
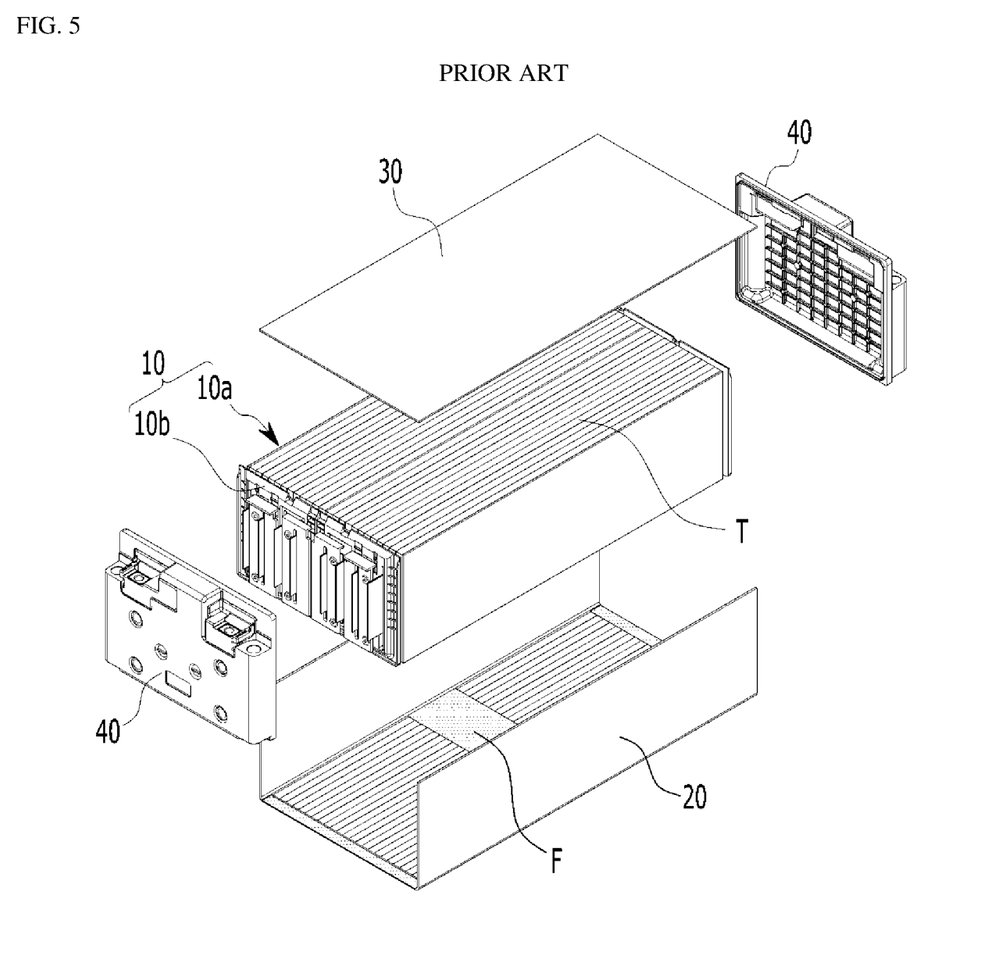
FIG. 5 is an exploded perspective view showing a battery module including a U-shaped frame as a comparative example.

FIG. 5 is an exploded perspective view showing a battery module including a U-shaped frame as a comparative example.

Referring to FIG. 5, conventionally, the battery module including a U-shaped frame may include a battery cell stack 10a in which a plurality of battery cells are stacked, a U-shaped frame 20 for housing the battery cell stack 10a, an upper plate 30 for covering the upper side of the battery cell stack 10a, and end plates 40 for covering the front and rear surfaces of the battery cell stack 10a.

The insulation performance in the battery pack structure is a safety performance which is essential for the stability of the battery pack. In order to secure the insulation performance, an insulating tape T can be attached to each of the upper end portions of the battery cells on the upper side of the battery cell stack 10a of FIG. 5, and an insulating film F can be attached to the bottom surface of the U-shaped frame 20. The insulation performance between the battery cell stack 10a and the outside may be secured through the insulating tape T and the insulating film F.

However, as shown in FIG. 5, the battery module must be manufactured by a process in which each of the battery cells must be individually attached to the insulating tape T, and after attaching an insulating tape to each of the battery cells, the cell block assembly 10 including the busbar frame 10b must be assembled to the battery cell stack 10a in which the battery cells are stacked. Thereafter, an insulating film F is attached to the bottom surface of the U-shaped frame 20, and the cell block stack 10 is inserted into the U-shaped frame 20, and then the upper plate 30 and the end plate 40 is assembled. Therefore, there is a problem in that the above-mentioned complicated manufacturing process is additionally required in order to secure insulation performance.

In addition, since the process of housing the battery modules in the battery pack is additionally required, a two-step process of manufacturing the battery cells in module units and then housing the battery modules manufactured in module units into the battery pack again is required, which causes a problem that the manufacturing process becomes complicated.

Figure 6:
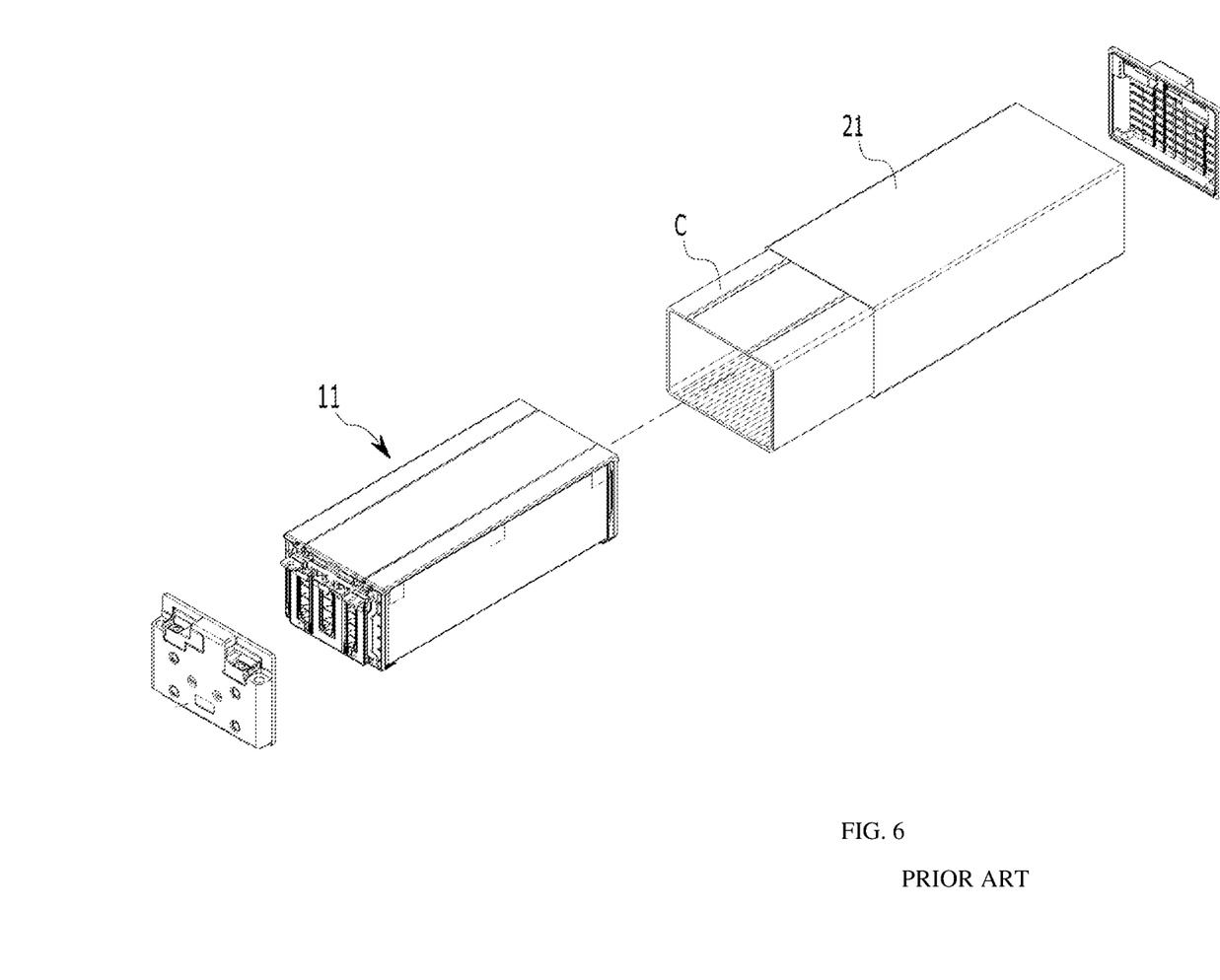
FIG. 6 is an exploded perspective view showing a battery module including a module frame formed on the upper, lower, left and right surfaces as a comparative example.

FIG. 6 is an exploded perspective view showing a battery module including a module frame formed on the upper, lower, left and right surfaces as a comparative example.

Referring to FIG. 6, the battery modules including a module frame formed in the upper, lower, left and right surfaces can secure insulation performance by inserting an insulating coating layer C between the cell block assembly 11 and the module frame 21 in which the battery cell stack and the bus bar frame are coupled. However, a process of coating the insulating coating layer C onto the inner wall of the module frame 21 is additionally required. Further, due to friction between the cell block assembly 11 and the insulating coating layer C inserted at the time of inserting the cell block assembly 11 into the insulating coating layer C, it is likely that the coating of the insulating coating layer C is damaged.

Thus, according to the embodiment of the present disclosure, there is an advantage in that a process of manufacturing a battery module and a process of attaching an insulating tape and an insulating film to the inside of the battery module as shown in FIG. 5 which is a comparative example, are not separately required. Further, according to the embodiment of the disclosure, there is an advantage in that a separate process of coating an insulating coating layer onto the module frame of the battery module as shown in FIG. 6, which is a comparative example, is not required, and there is no risk of damage to the insulator 430 by being mounted on the module region of the lower pack housing 100 while the insulating member 430 is wrapped.

In addition, since it is sufficient to wrap the insulating member 430 in the battery cell stack 410, the manufacturing process can be simplified, the insulator 430 is coupled so as to be in direct contact with the battery cell stack 410, and direct insulation of the battery cell stack 410 is possible and thus, the insulation performance can be improved.

Further, the insulator 430 is formed so as to surround the side circumferential direction of the battery cell stack 410 as shown in FIG. 6, thereby performing the role of minimizing the flow of the battery cell stack 410 and fixing the battery cell stack 410.

According to the present embodiment, side surface plates 420 may be located between both side surfaces of the battery cell stack 410 and the insulator 430. The side surface plate 420 may be formed of an elastic member to absorb swelling of the battery cell stack 410. According to this embodiment, the side surface plate 420 may be formed of an elastic rubber material, and is formed by injection and can secure a certain level of strength.

The insulator 430 may be formed of a heat shrinkage tube. The insulating function of the battery cell stack 410 is secured through the insulator formed of the heat-shrinkable tube, and the tube contracts when the temperature rises, and tightly couples to the battery cell stack 410 to fix the battery cell stack 410.

In addition, the insulator 430 may also be formed of an insulating tape. The battery cell stack 410 can be fixed by adhering the insulating tape to the battery cell stack 410.

The battery pack may have a structure in which one or more of the battery modules according to the present embodiment are gathered, and packed together with a battery management system (BMS) and a cooling device that control and manage battery's temperature, voltage, etc.

The battery pack can be applied to various devices. Such a device may be applied to a vehicle such as an electric bicycle, an electric vehicle, or a hybrid vehicle, but the present disclosure is not limited thereto, and is applicable to various devices that can use a battery module, which also belongs to the scope of the present disclosure.

Although the invention has been shown and described with reference to the preferred embodiments, the scope of the present disclosure is not limited thereto, and numerous other modifications and embodiments can be devised by those skilled in the art that will fall within the spirit and scope of the principles of the invention described in the appended claims. Further, these modified embodiments should not be understood individually from the technical spirit or perspective of the present disclosure.

DESCRIPTION OF REFERENCE NUMERALS

100: lower pack housing
110: partition wall
200: upper pack housing

300: thermally conductive resin layer
400: cell block
410: battery cell stack
420: side surface plate
430: insulator

The invention claimed is:

1. A battery pack comprising:
  a lower pack housing having a plurality of module regions;
  a plurality of thermally conductive resin layers disposed in respective ones of the plurality of module regions; and
  a plurality of cell blocks mounted on respective ones of the plurality of module regions at an upper side of the respective thermally conductive resin layer,
  wherein each of the plurality of cell blocks comprises:
  a battery cell stack in which a plurality of battery cells are stacked; and
  an insulator that surrounds the battery cell stack,
  wherein each of the plurality of cell blocks is formed only of the battery cell stack and the insulator.

2. The battery pack according to claim 1,
  which further comprises an upper pack housing that covers an upper portion of the plurality of cell blocks.

3. The battery pack according to claim 1,
  wherein in each of the plurality of cell blocks, the insulator covers upper, lower, left and right surfaces of the battery cell stack except for a portion in which an electrode lead is disposed in the battery cell stack.

4. The battery pack according to claim 1,
  wherein in at least one of the plurality of cell blocks, the insulator is a heat shrinkage tube.

5. The battery pack according to claim 1,
  wherein in at least one of the plurality of cell blocks, the insulator is an insulating tape.

6. A device comprising the battery pack as set forth in claim 1.

* * * * *